Dec. 17, 1935. W. C. MASON 2,024,467
COMBINED STEAM GENERATOR AND OIL BURNER
Filed Nov. 25, 1931 3 Sheets-Sheet 1

INVENTOR
William C. Mason
By
ATTORNEYS

Dec. 17, 1935.  W. C. MASON  2,024,467
COMBINED STEAM GENERATOR AND OIL BURNER
Filed Nov. 25, 1931  3 Sheets-Sheet 2

INVENTOR
William C. Mason
By
ATTORNEYS

Patented Dec. 17, 1935

2,024,467

UNITED STATES PATENT OFFICE 2,024,467

COMBINED STEAM GENERATOR AND OIL BURNER

William C. Mason, Albany, N. Y.

Application November 25, 1931, Serial No. 577,314

18 Claims. (Cl. 219—40)

One of the objects of my invention is the provision of a generator in which the liquid is heated and steam generated initially by spaced electrodes and the steam pressure maintained substantially constant by varying the active surface between the electrodes.

Another object of my invention is the provision of novel means for the regulation of the liquid level relatively to the electrodes.

A further object of my invention is the provision of means for utilizing and controlling the steam from the generator for the purpose of atomizing oil for an oil burner.

A still further object of my invention is the provision of novel means for controlling the supply of liquid to the generator.

Other objects of my invention will appear in the specification and will be particularly pointed out in the claims.

My invention will best be understood by reference to the accompanying drawings in which I have illustrated certain embodiments thereof and in which—

Like reference characters indicate like parts throughout the drawings.

Figure 2:
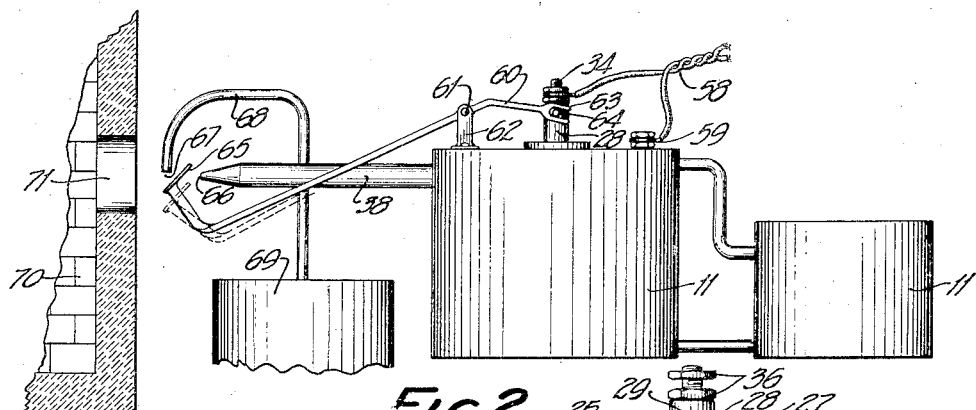
Fig. 2 is a side view illustrating the steam generator of Fig. 1 diagrammatically and combined with a combustion furnace and an oil burner associated therewith.

Referring now to the drawings and first to the embodiment of my invention illustrated in Figs. 1 to 4, 10 indicates generally a steam generator comprising a boiler shell 11 provided with chambers 12 and 13, the portions of the shell preferably being partially cylindrical in form. Within the chamber 12 are located two spaced electrodes, a stationary electrode 14 and a movable electrode 15. These electrodes are formed of any suitable material, but are preferably formed of carbon or graphite. The stationary electrode 14 is preferably secured to the frame 111 of the boiler shell as by screws 16. The movable electrode is preferably provided with outwardly extending members 17 of insulating material for maintaining the electrodes in properly spaced relation, and a member 18 which is preferably in the form of a cylinder and may be formed of porcelain or the like, interposed between the bottom portion of the movable electrode and the bottom portion of the cup-shaped recess in the stationary electrode. The chamber 12 is preferably enclosed by an insulating casing 19 within the shell 11 for preventing electrolysis between the electrodes and the metallic shell. The insulating casing 19 is provided at its lower portion with an opening 20 which affords communication between the two chambers and is also provided with an opening 21 through which passes a control member 22 which will be more fully described hereinafter.

Figure 1:
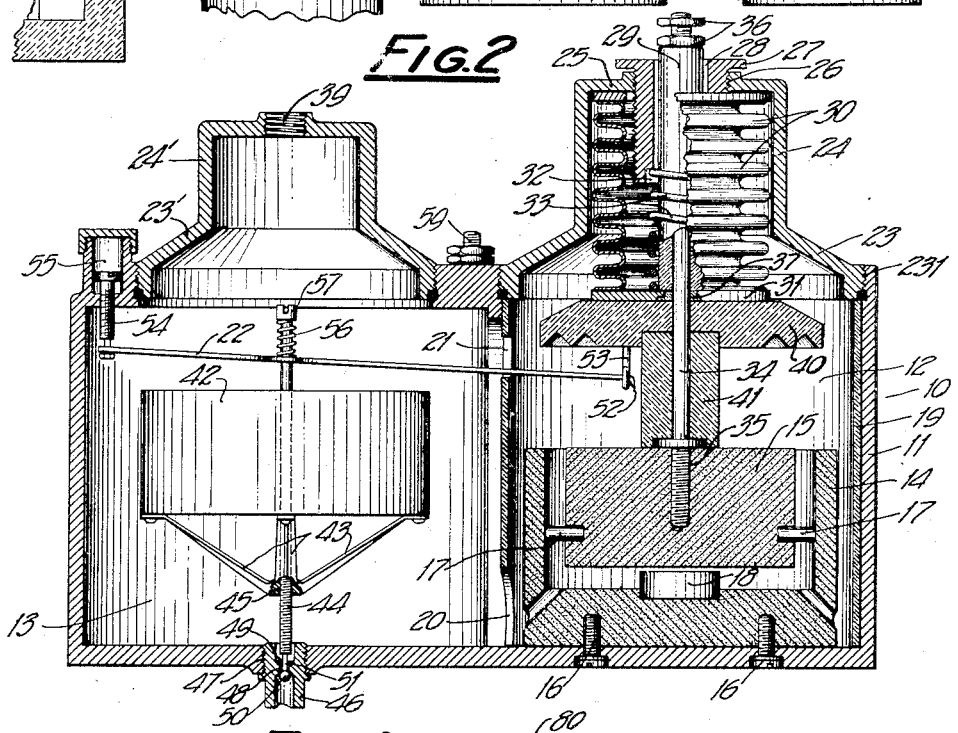
Fig. 1 is a vertical sectional view through a steam generator embodying my invention.
Figure 4:
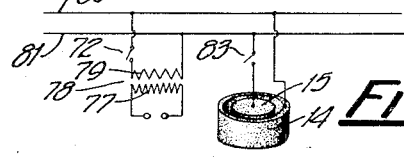
Fig. 4 is a diagram of connections.

In accordance with my invention, means are provided for maintaining the steam pressure within the generator substantially constant. The boiler shell 11 in the embodiment illustrated in Fig. 1 is provided at the upper end with a conical portion 23 and a contracted cylindrical portion 24, the contracted portion which is integral with the conical portion preferably being separate from the main shell to which it may be connected as by screw threads, as indicated at 231. The top plate 25 of the cylindrical portion is provided with a screw threaded opening 26 in which is received a screw threaded member 27. The member 27 is provided with an opening 28 through which extends a sleeve 29, formed of insulating material.

A bellows 30 is located within the cylindrical portion 24 of the generator shell, the upper end of the bellows being seated against the plate 25, its movable end being closed by a bottom plate 31 forming a fluid-tight joint with the collapsible portion of the bellows. The member 27 is provided with a recess 32 surrounding the sleeve 29, and a coil spring 33 is interposed between the member 27 and the bottom plate 31 of the bellows, the upper end of the spring being received within the recess 32.

A rod or stem 34 is secured at its lower end to the movable electrode 15 as by being screwed into a recess therein as at 35. The upper portion of the stem 34 passes through the sleeve 29 and forms a terminal for the movable electrode 15, the upper end of the stem preferably being screw threaded in a usual manner and provided with clamping nuts 36 for terminal connection. The stationary electrode 14 is grounded to the casing which is provided with a terminal connection 59. The member 27 forms a convenient means for adjusting the force or pressure necessary for operating the bellows. The bottom plate 31 of the bellows is provided with an opening surrounding the stem 34 in which is received an insulating washer 37. The pipe 38 for supplying steam for atomizing the oil is connected into an opening 39 (Fig. 2) in the upper portion of the shell surrounding the chamber 13. A baffle 40 is seated against the bottom of the plate 31 of the bellows, and is suitably spaced from the inner electrode 15 by a spacing post 41.

The boiler shell surrounding the chamber 13 in the embodiment illustrated is substantially the same as that surrounding the chamber 12 and is provided with a similar conically shaped portion 23' and cylindrical portion 24' which, however, in this case is closed at the top to form a steam dome. Within the chamber 13 is located a float 42 preferably provided on its lower side with a downwardly projecting bracket 43, a stem 44 passing through an opening 45 in the bracket and also passing through the float as indicated, the stem preferably extending upwardly above the float.

A liquid supply pipe 46 is connected into an opening 47 in the lower plate of the chamber 13, and is provided with a contracted portion 48 forming a valve seat and provided with an opening 49, a ball valve 50 being attached to the lower end of the stem 44 preferably by a contracted connecting member 51.

The member 22 which passes through the opening 21 is provided at one end with a hook 52 which is received in an eye member 53 attached to the baffle 40. The opposite end of the member 22 is loosely connected to a screw member 54 received in the top plate of the shell and accessible through a recess 55. The intermediate portion of the member 22 surrounds the stem 44, and a spring 56 is interposed between the member 22 and a head 57.

In the diagrammatic view illustrated in Fig. 2, the chambers enclosed by the shells 11 are shown as physically distinct and connected by pipes merely for clearness of illustration.

The conductors for the current supplied to the electrodes are indicated at 58 and are connected to the stem 34 and to a ground as at 59 respectively.

A lever 60 is pivoted as at 61 on a post 62 mounted on the upper end of the boiler shell, one end of the lever 60 being provided with yokes 63, (only one of which is illustrated in Fig. 2) engaging pins 64 on the sleeve 29. The free end of the lever 60 is provided with a baffle 65 which is interposed, when the generator is not in operation, between the orifice 66 of the atomizing head of the steam pipe and the end 67 of an oil pipe 68 which is connected to a suitable reservoir 69. The oil burner is associated with a combustion furnace indicated at 70, a wall of which adjacent the oil burner is provided with an opening 71.

A switch indicated generally at 72 (see Figs. 3 and 4) controls an ignition circuit for the oil. An arm 73 is mounted on the upper end of the stem 34 and is provided at its end with a contact member 74. In the position indicated in Fig. 3, the contact member engages only the lower one of two yielding contact members 75. In this position, the ignition circuit, including the conductors 76, is open. As the stem 34 further rises, the contact member 74 will momentarily engage both the upper and lower contact springs 75 thereby closing the ignition circuit and igniting the oil spray. In the embodiment of my invention illustrated in Fig. 4, the ignition circuit includes the secondary 77 of a transformer indicated generally at 78, the primary 79, in which is included the switch 72, being connected to line wires 80 and 81. A switch 83 (Fig. 4), which may be manually operated, is also preferably included in one of the connections leading from a line conductor to one of the electrodes.

In case the oil burner is located comparatively near the generator, I prefer the arrangement illustrated in Fig. 1, for controlling the atomization by the steam.

Figure 5:
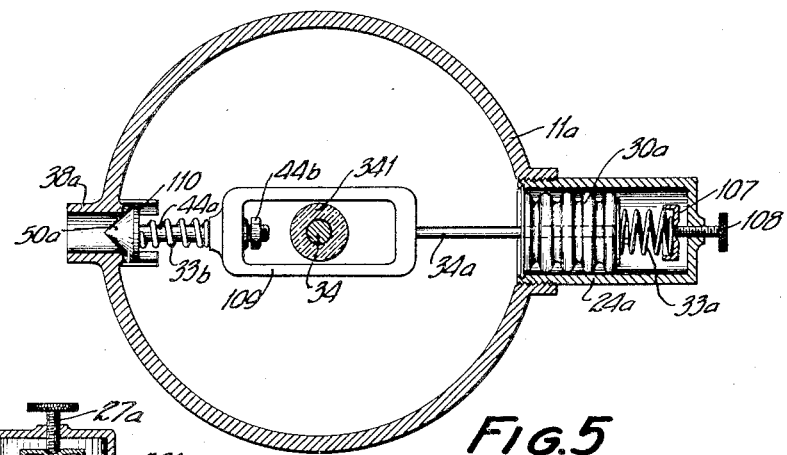
Fig. 5 is a sectional view illustrating a modified form of control for the atomizing steam.

In Fig. 5, I have illustrated a modified form of control which is particularly applicable where the burner is located at some distance from the steam generator. In this embodiment of my invention, a separate bellows 30a is secured to the shell 11a of the generator and is preferably enclosed in a housing 24a preferably secured to said shell. The expansion of the bellows is resisted by a spring 33a seated against the end of the bellows and in a member 107 which is adjustable by a screw-threaded member 108. A stem or rod 34a engages the end of the bellows and is connected to a yoke 109 which surrounds the stem 34 and the insulating sleeve 341. A valve stem 44a is mounted in an opening in the yoke 109 and is provided at its free end with a valve 50a which seats against the inner end of the steam atomizing pipe 38a. A spring 33b engages a collar 110 and the yoke.

The inner end of the valve stem 44a is provided with an adjustable nut 44b which permits the yoke member 109 to move to the right as viewed in Fig. 5 before engaging the nut 44b and thereby releasing the valve 50a from its valve seat. The parts then assume an equilibrium, the valve being open sufficiently to permit the same amount of steam to escape that is generated. It will be understood that a rough adjustment may be secured by the adjustable nut 44b and a finer adjustment by the screw 108 which is accessible from the exterior of the device.

The operation of the device embodying my invention will readily be understood from the foregoing description and is as follows.

Assuming that no liquid is in the generator, the float 42 will depress the ball valve 50 from its seat permitting liquid to flow into the generator until the float moves the ball valve to a closed position. When the valve closes, the liquid is preferably substantially at the level of the upper edge of the stationary electrode. The circuit in which the electrodes 14 and 15 are included is then closed by the switch 83, and the passage of current between the electrodes heats the liquid and quickly generates steam.

As pressure begins to build up within the generator, the bellows 30 begins to collapse; in other words the lower plate 31 of the bellows is moved upwardly thereby forcing upwardly the sleeve 29 and the stem 34 which is secured thereto, thereby raising the inner movable electrode 15 and decreasing the amount of liquid between the electrodes and correspondingly decreasing the conducting surfaces between the electrodes and the steam generated by the current. At the same time, the lifting of the electrode 15 out of the liquid lowers the liquid level. The lowering of the liquid level causes the float to fall until it unseats the ball valve 50 and water again flows into the generator. The liquid level then rises, preferably until it approximately reaches the upper edge of the stationary electrode. The inner electrode is now partially lifted from its position within the stationary electrode and to a point where sufficient steam is generated to compensate for the loss of steam passing through the steam pipe 38. At the same time the float is so adjusted that the valve 50 is slightly unseated permitting sufficient liquid to flow into the generator to compensate for the loss of liquid due to steam generation. The device thus maintains the steam pressure within the generator substantially constant and a predetermined steam pressure may be secured by regulation of the screw member 54 to which one end of the arm 52 is pivoted. It is to be understood that the adjustment of the members 27, 54 and 57 must be coordinated with each other.

As soon as sufficient pressure, for example three or four pounds, has been reached in the generator, the upward movement of the stem 34 rocks the lever arm 60 about the pivot 61, thereby withdrawing the baffle 65 from its normal position between the orifice 66 of the steam pipe 38 and the end 67 of the oil supply pipe 68, thereby spraying oil into the furnace. At the same time the upward movement of the stem 34 closes the switch 82 in the manner above described and the oil spray is ignited. As soon as the pressure is slightly increased the ignition circuit is opened.

Figure 6:
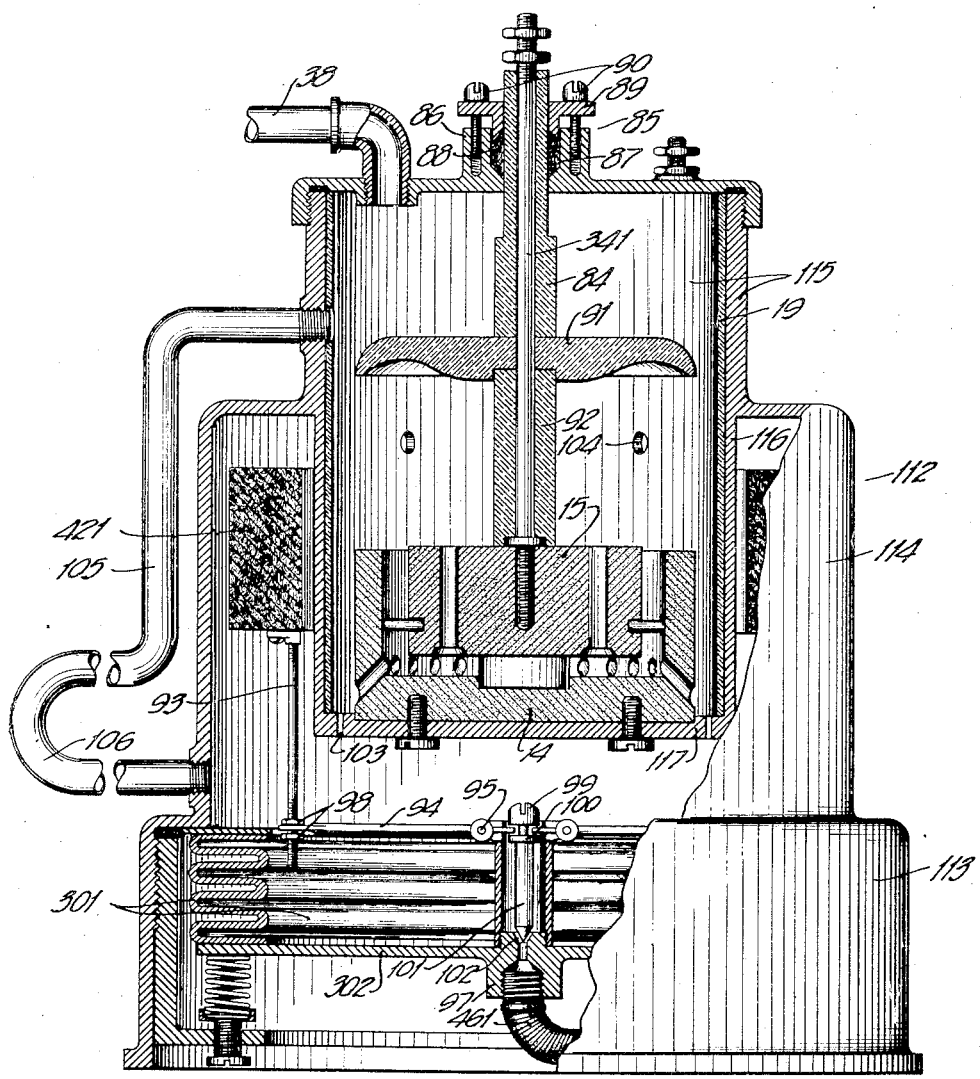
Fig. 6 is a side view, partially broken away, of a modified and preferred form of my invention.

In Fig. 6 I have shown a modified form of my invention in which the generator is enclosed in a single generally cylindrical shell 112 comprising a lower cylindrical portion 113, which encloses the bellows 301, an intermediate portion 114 of smaller diameter than the portion 113 and an upper cylindrical portion 115 of smaller diameter than the intermediate portion. A downward extension 116 of the shell, and which is illustrated as of the same diameter as the upper section 115, is enclosed in the intermediate portion 114 and in turn encloses the stationary electrode 14 and the inner movable electrode 15, which is spaced from the outer electrode in the same manner as described in connection with Fig. 1.

The stationary electrode is secured to the lower plate 117 of the extension 116 to which it is grounded as in Fig. 1. The inner electrode is carried by the stem 341, the same as in Fig. 1, and the stem is secured to an insulating sleeve 84 which passes through a packing gland indicated generally at 85. The gland comprises a lug 86 formed with a recess 87 in which packing material 88 is received, and when the gland plate 89 is forced downwardly by the screws 90, the packing material grips the insulating material 84 and retains the same in position. A baffle 91 is interposed between the lower end of the insulating member 84 and an insulating sleeve 92 between the baffle and the electrode 15. The baffle 91 serves to prevent water which may be thrown upwardly in the form of a spray, because of the bubbles rising between the electrodes, from reaching the steam atomizing pipe 38.

In this embodiment of my invention the inner electrode is manually movable instead of being movable in response to the steam pressure within the generator, and enables the operator to adjust one electrode relatively to the other. It is well understood that the conductivity of water varies in accordance with its acidity, alkalinity and other factors, and the operator can so adjust the electrodes as to secure a substantially uniform conductivity between them. The float 421, in the embodiment of my invention illustrated in Fig. 6, surrounds the shell 116 and is connected preferably by two links 93, only one of which is illustrated in the drawings, to the outer ends of arms 94 pivoted at 95 on a tubular member 96 secured to an upwardly extending lug 97 on the bottom plate 302 of the bellows. It will be noted that the outer ends of the arms 94 are loosely received between the nuts 98 on the stem 93. The inner ends of each arm 94 are received between a head 99 and a plate or collar 100 on a needle valve stem 101 which cooperates with a seat 102 formed in the base member 302 to which the feed supply pipe 461 is connected.

In this embodiment of my invention, the plate 117 is provided with openings 103 while the upper portion of the shell or casing 116 is provided with openings 104 which afford communication between the chamber above the electrodes and the space within the intermediate portion 114 of the shell which is above the float 421. An insulating casing 19, similar to that shown in Fig. 1 is enclosed within the portions 115 and 116 of the shell to prevent electrolysis.

In the embodiment of my invention illustrated in Fig. 6 one or more tubes 105 are connected to the upper portion 115 of the shell and to the lower part of the intermediate portion 104, and each tube is provided with a curved portion 106 which extends into the heated zone of the burner. When combustion in the furnace takes place, then the circulating tubes 105 generate a sufficient amount of steam to force the bellows down far enough to carry the water level below the electrodes so that normally the steam is produced in the generator by heat in the combustion furnace which is more economical than where the heat is produced electrically during the normal operation. If, in case of failure of power or for other reasons the generation of current fails, then steam may be generated initially between the electrodes by the application of external heat to the tubes 105. It is to be understood that when the bellows is expanded and lowers the water level about the electrodes, the volume of water in the generator remains constant save for that portion which is expelled as steam through the outlet 28. Hence, inasmuch as the float for the water admission valve operates said valve in response to variations in the water level in the generator, the operation thereof is also further controlled by the volume of water contained in the generator and sylphon bellows as hereinbefore described.

It will be understood that a baffle member 65 is normally located between the orifice of the steam atomizing pipe and the end of the oil pipe and operates in the same manner as that described in connection with Fig. 2. It will, of course, also be understood that the lever arm 60 is connected to the bellows 301. The connections and general arrangement of parts could readily be made by anyone skilled in the art and, therefore, for clearness of illustration have not been shown.

The operation of the device illustrated in Fig. 6 is as follows:

Assuming that liquid in the generator is at about the level of the upper edge of the outer electrode 14, the float pulls the outer ends of the arms 94 upwardly thereby depressing the needle valve and closing the valve. Now when the switch 83 is closed, current is turned on and steam is generated. As the steam pressure builds up, the bottom plate 302 of the bellows is depressed thereby lowering the water level in the generator and carrying the water below the upper edges of the electrodes and decreasing the current passing between the electrodes. The escape of steam and the attendant loss of water in the chamber causes the float 421 to move downwardly due to the fall of water level and the float opens the needle valve and again admits water to the generator. The parts are preferably so adjusted that normally the float is submerged slightly more than it would be due to its own buoyancy.

Figure 7:
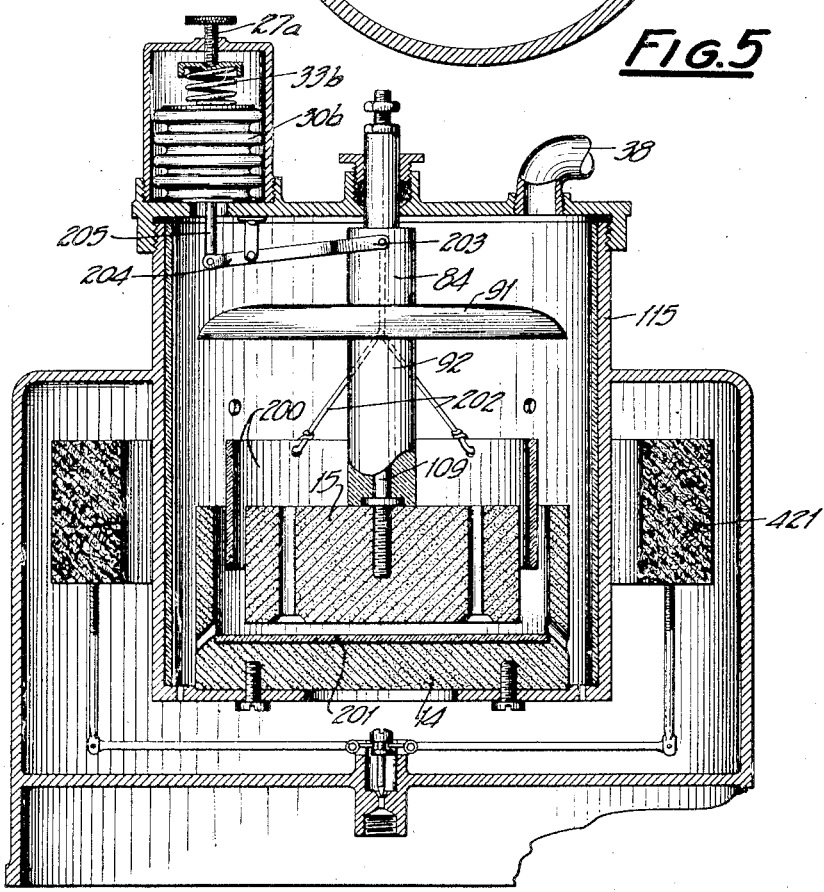
Fig. 7 is a sectional view similar to Fig. 6 illustrating a further modification.

In the embodiment of my invention illustrated in Fig. 7, the resistance between the electrodes and correspondingly the amount of steam generated therebetween is regulated by the movement of an insulating shield into and out of position between the active surfaces of the two electrodes. A bellows 30b, or other expansible member, is mounted on the cap or cover which closes the upper section 115 of the shell of the generator. The upper end of the bellows is closed at the top, and the movement thereof is resisted by a spring 33b one end of which is seated against the upper end of the bellows and the other end of which engages the lower end of an adjustable member, preferably in the form of a screw 27a. A shield 200 formed of insulating material and preferably cylindrical in form is located between the inner and outer electrodes 14 and 15 and is adjustable vertically therebetween. A stationary plate 201 of insulating material is mounted in position within the stationary electrode and covers the bottom portion thereof to prevent the passage of current between the inner electrode and the bottom surface of the outer electrode. The upper portion of the shell 197 is mechanically connected by links 202 passing upwardly on opposite sides of the sleeves 84 and 92 through suitable openings in the deflector 91 and are pivoted to the fork or yoke 203 on an arm 204 pivoted to a stem 205 connected to the bellows.

Figure 3:
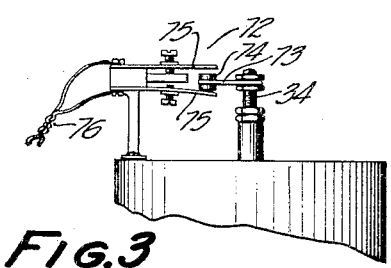
Fig. 3 is a fragmentary side view illustrating a switch coacting with the steam generator for controlling an ignition circuit for the oil burner.

The operation of the modified form of my invention illustrated in Fig. 7 is substantially the same as the embodiment illustrated in Fig. 3 with the exception that a shield is raised and lowered by the bellows 30a instead of the water level being raised and lowered as in the case of Fig. 6, and the shield controls the amount of active surface between the electrodes and the rate of steam generation.

While I have illustrated my invention in connection with a single phase alternating current, it is to be understood that it is equally applicable to a direct current system or to a single phase three-wire system with a grounded neutral or a three-phase, four-wire Y connection or a three-phase, three-wire delta connection. In the arrangement illustrated in Fig. 1, I move one of the electrodes relatively to the other and relatively to the liquid level and thereby vary the amount of liquid contained between the two electrodes, while in Fig. 6, I accomplish the same result by varying the water level itself, and in Fig. 7 I also accomplish the same result by moving the shield.

While I have described my invention in its preferred embodiment it is to be understood that the words which I have used are words of description and not of limitation and that changes within the scope of the appended claims may be made without departing from the true scope and spirit of my invention in its broader aspects.

What I claim is:

1. In a steam generator, spaced electrodes forming a heating element located at least in part below the liquid level in said generator, and means comprising means operable in response to variations in the position of the liquid level in said generator and means responsive to the vapor pressure therein for controlling the admission of liquid thereto.

2. In a steam generator, spaced electrodes forming a heating element located at least in part below the liquid level in said generator, and means comprising means operable in response to variations in the position of the liquid level in said generator and means responsive to the vapor pressure therein for controlling the admission of liquid thereto; said pressure responsive means being operable to vary the heat-generating capacity of said electrodes.

3. In a steam generator, spaced electrodes forming a heating element located at least in part below the liquid level in said generator, means for controlling the admission of liquid to said generator, means responsive to the vapor pressure in said generator for varying the heat-generating capacity of said electrodes and controlling said first mentioned means, and means operable in accordance with variations in the position of the liquid level in said generator for further controlling said first mentioned means.

4. In a combined steam generator and fuel burner, means for electrically heating the liquid in said generator, steam generating means comprising a conduit extending into the heated zone of said fuel burner and connected to different levels of said generator, and means responsive to the steam pressure within said generator for opening the circuit of the electrical heating means, whereby the steam in said generator is then produced by said steam generating means exclusively.

5. In a combined steam generator and fuel burner, an electric circuit, means included within said circuit for electrically heating the liquid in said generator, means for varying the liquid level in said generator, means for supplying feed water to said generator, steam generating means comprising a conduit extending into the heated zone of said fuel burner and connected to different levels of said generator, said means having a steam generating capacity capable of producing in the steam generator steam pressure sufficient to force the liquid level downwardly and thereby control the current to the electric heater.

6. In combination, a steam generator, electrically operated means for heating liquid therein, automatic means for maintaining substantially constant pressure therein, a fluid fuel burner associated with said steam generator, and steam supply means communicating with said generator for atomizing the fuel for said burner.

7. In combination, a steam generator, electrically operated means for heating liquid therein, automatic means for maintaining substantially constant pressure therein, a fluid fuel burner comprising a fuel supply pipe associated with said generator, and a steam pipe communicating with said steam generator and leading to a point adjacent to the orifice of said fuel supply pipe.

8. In combination, a steam generator, automatic means for maintaining substantially constant pressure therein, an oil burner comprising an oil supply pipe associated with said generator, a steam pipe communicating with said generator, and leading to a point adjacent to the orifice of said oil supply pipe for atomizing the oil for said burner, and means responsive to the steam pressure in said generator for controlling the flow of steam through said steam pipe to the orifice of said oil burner.

9. In combination, a steam generator, electrically operated means for heating the liquid therein, automatic means for maintaining substantially constant pressure therein, an oil burner comprising an oil supply pipe associated with said generator, a steam pipe communicating with said generator and leading to a point adjacent to the orifice of said oil supply pipe for atomizing the oil for said burner, means for normally deflecting the steam from the orifice of said pipe, and means responsive to the pressure in said generator for moving said deflector out of the path of the steam.

10. In combination, a steam generator, electrically operated means for heating the liquid therein, automatic means for maintaining substantially constant pressure therein, an oil burner comprising an oil supply pipe associated with said generator, a steam pipe communicating with said generator and leading to a point adjacent to the orifice of said oil supply pipe for atomizing the oil for said burner, and means responsive to the pressure in said generator for igniting the oil.

11. In a steam generator comprising electrical means for heating the liquid therein, means responsive to the vapor pressure in said generator for regulating the height of the liquid level relatively to said electrical heating means and means comprising a float for controlling the admission of feed water to said generator; said pressure responsive means and said feed water control means being movable together whereby said water control means is operable in response to relative movements between said float and said pressure responsive means.

12. In a steam generator, an electric circuit, spaced electrodes located at least in part below the normal water level in said generator, a hollow expansible member communicating with said generator, a float flexibly connected to said expansible member, means responsive to the movement of said member for varying the position of the water level in said generator and thereby varying the conductivity between said electrodes and means responsive to the relative movement between said float and said expansible member for controlling the admission of feed water to said generator.

13. A steam generator comprising, a water container, an electrical immersion heater therein, an expansion chamber communicating with said container below the water level therein, whereby water will be forced from said container into said chamber by steam pressure, thereby reducing the height or depth of water about the heater, a water supply for said generator and means responsive to variations in the water level in said container and responsive to variations in the volume of water in said container and expansion chamber for controlling the volume of water in said generator.

14. In a steam generator, means for heating the liquid therein, an expansion chamber communicating with the liquid in said generator and affording an auxiliary chamber in which a variable amount of liquid is received in accordance with the pressure in said generator, and means responsive to variations in the liquid level in said generator and to variations in the volume of liquid in said generator and expansion chamber for controlling the admission of liquid thereto.

15. In a steam generator, electric means for heating the liquid therein, an expansion chamber communicating with the liquid in said generator and affording an auxiliary chamber in which a variable amount of liquid is received in accordance with the pressure in said generator, and means responsive to variations in the liquid level in said generator and to variations in the volume of liquid in said generator and expansion chamber for controlling the admission of liquid thereto.

16. In a steam generator, electrodes at least partially immersed in the liquid therein under normal operating conditions, an expansion chamber communicating with the liquid in said generator and affording an auxiliary chamber in which a variable amount of liquid is received in accordance with the pressure in said generator, and means responsive to variations in the liquid level in said generator and to variations in the volume of liquid in said generator and expansion chamber for controlling the admission of liquid thereto.

17. In a steam generator, electrodes at least partially immersed in the liquid therein under normal operating conditions, a chamber in the walls of which are expansible communicating with the liquid in said generator and affording an auxiliary chamber in which a variable amount of liquid is received in accordance with the pressure in said generator, and means responsive to variations in the liquid level in said generator and to variations in the volume of liquid in said generator and expansion chamber for controlling the admission of liquid thereto.

18. In a vapor generator comprising electrical means for heating the liquid therein and having an auxiliary chamber associated therewith, means responsive to the vapor pressure therein for varying the volume of liquid in said generator and means responsive to variations in the total liquid volumes in said generator and chamber for controlling the admission of liquid thereto.

WILLIAM C. MASON.

CERTIFICATE OF CORRECTION.

Patent No. 2,024,467.                                  December 17, 1935.

WILLIAM C. MASON.

It is hereby certified that error appears in the printed specification of the above numbered patent requiring correction as follows: Page 3, first column, line 13, for the numeral "52" read 22; page 4, second column, line 68, claim 8, after the comma and before the syllable "auto-" insert the words electrically operated means for heating the liquid therein; page 5, second column, line 40, claim 17, strike out the word "in"; and that the said Letters Patent should be read with these corrections therein that the same may conform to the record of the case in the Patent Office.

Signed and sealed this 11th day of February, A. D. 1936.

Leslie Frazer
Acting Commissioner of Patents.

(Seal)